United States Patent [19]
Lim

[11] Patent Number: 5,706,122
[45] Date of Patent: Jan. 6, 1998

[54] METHOD FOR THE FORMATION OF A THIN FILM ACTUATED MIRROR ARRAY

[75] Inventor: Yong-Geun Lim, Seoul, Rep. of Korea

[73] Assignee: Daewoo Electronics Co., Ltd., Seoul, Rep. of Korea

[21] Appl. No.: 698,383

[22] Filed: Aug. 15, 1996

[30] Foreign Application Priority Data

Aug. 22, 1995 [KR] Rep. of Korea ............ 95-25838
Sep. 14, 1995 [KR] Rep. of Korea ............ 95-29932

[51] Int. Cl.⁶ .................................................... G02B 26/00
[52] U.S. Cl. ............................. 359/291; 359/290; 359/292
[58] Field of Search ............................. 359/297, 900, 359/292, 293, 291

[56] References Cited

U.S. PATENT DOCUMENTS

5,107,533  4/1992  Jaskie ............................ 359/291
5,124,834  6/1992  Cusano et al. ................ 359/291
5,506,720  4/1996  Yoon .............................. 359/291

Primary Examiner—Frank G. Font
Assistant Examiner—Reginald A. Ratiff
Attorney, Agent, or Firm—Anderson Kill & Olick, P.C.

[57] ABSTRACT

A method for the manufacture of an array of M×N thin film actuated mirrors for use in an optical projection system is disclosed. The method includes the steps of: providing an active matrix; depositing a thin film sacrificial layer; creating an array of empty cavities in the thin film sacrificial layer; forming an array of actuating structures on top of the thin film sacrificial layer including the empty cavities, each of the actuating structures including a first thin film electrode, a thin film electrodisplacive member, a second thin film electrode and an elastic member; forming a thin film protection layer completely covering each of the actuating structures; removing the thin film sacrificial layer by using an etchant; rinsing away the etchant by using a rinse which is DI water or hydrophilic and volatile; removing the rinse by a spin drying method followed by a heat treatment; and removing the thin film protection layer, thereby forming the array of thin film actuated mirrors.

14 Claims, 7 Drawing Sheets

METHOD FOR THE FORMATION OF A THIN FILM ACTUATED MIRROR ARRAY

FIELD OF THE INVENTION

The present invention relates to an optical projection system; and, more particularly, to an improved method for the manufacture of an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

Figure 1A:
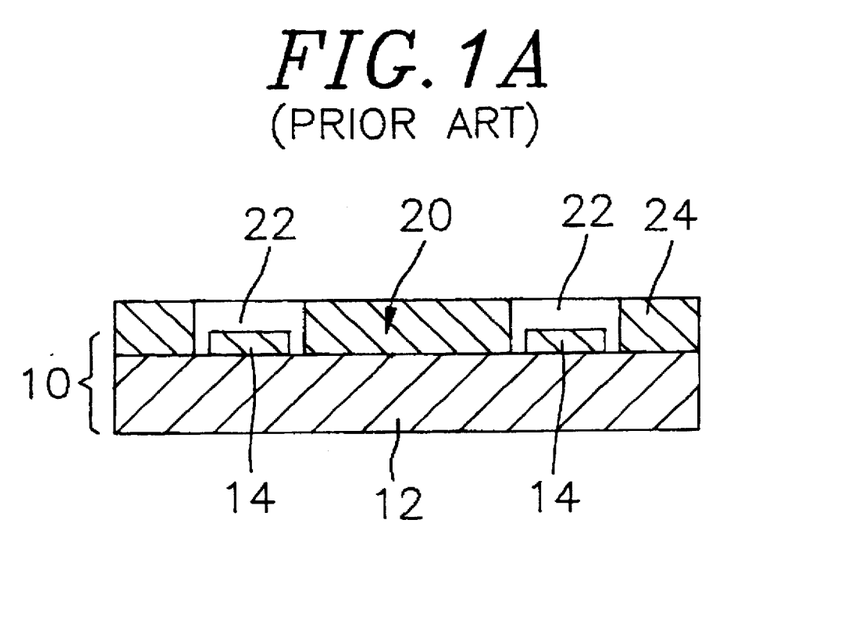
FIGS. 1A, 1B, 1C, 1D, 1E, 1F and 1G are schematic cross sectional views illustrating a method for the manufacture of an array of M×N thin film actuated mirrors previously disclosed.

The process for manufacturing the array 100 begins with the preparation of an active matrix 10 having a top surface and comprising a substrate 12, an array of M×N transistors (not shown) and an array of M×N connecting terminals 14.

In a subsequent step, there is formed on the top surface of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

Figure 1B:
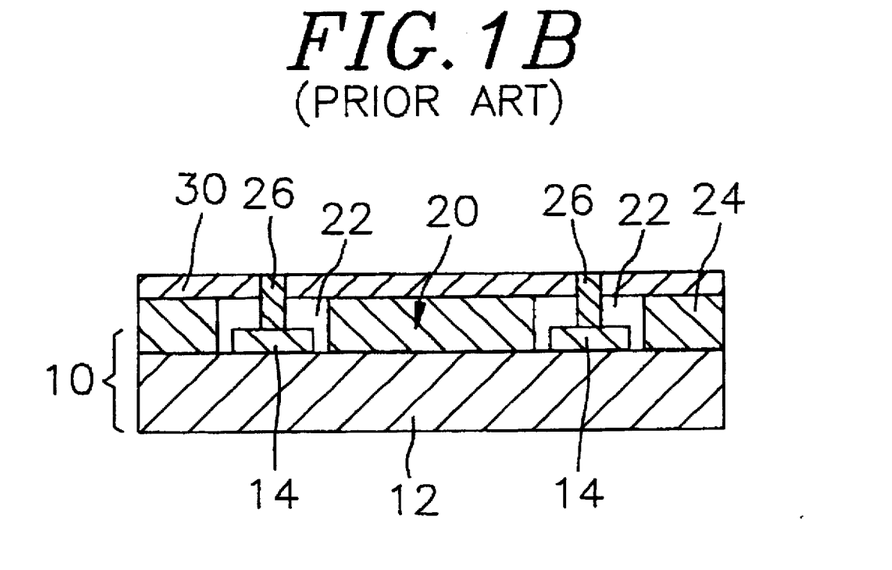

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

Figure 1C:
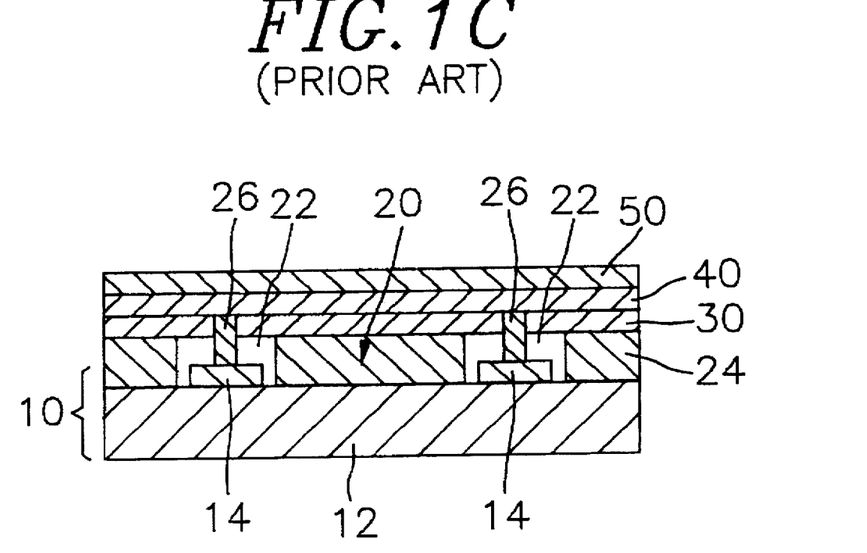

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate (PZT), is formed on top of the second thin film layer 40 by using a sputtering method, a CVD method or a Sol-Gel method, as shown in FIG. 1C.

Figure 1D:
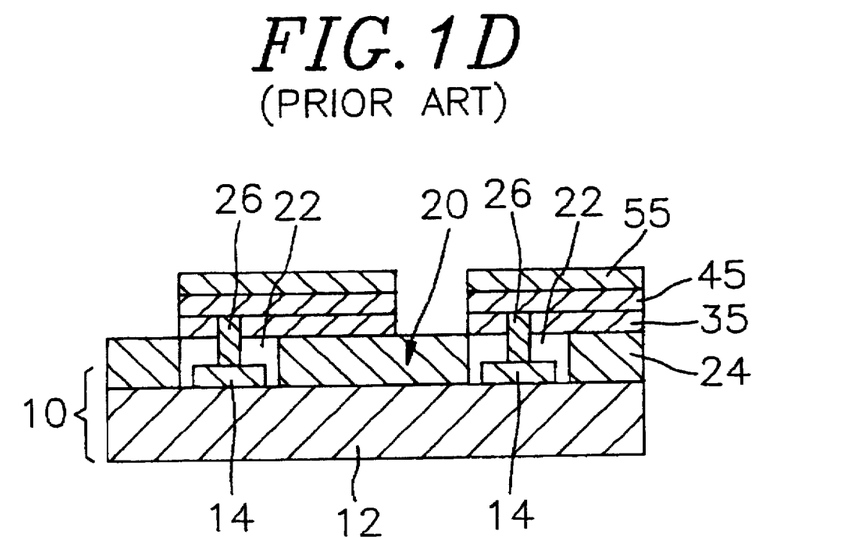

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the supporting layer 20 is exposed, as shown in FIG. 1D. Each of the second thin film electrodes 45 is electrically connected to the transistor through the conduit 26 formed in each of the supporting members 22 and functions as a signal electrode in the thin film actuated mirrors 101.

Next, each of the thin film electrodisplacive members 55 is heat treated to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

Figure 1E:
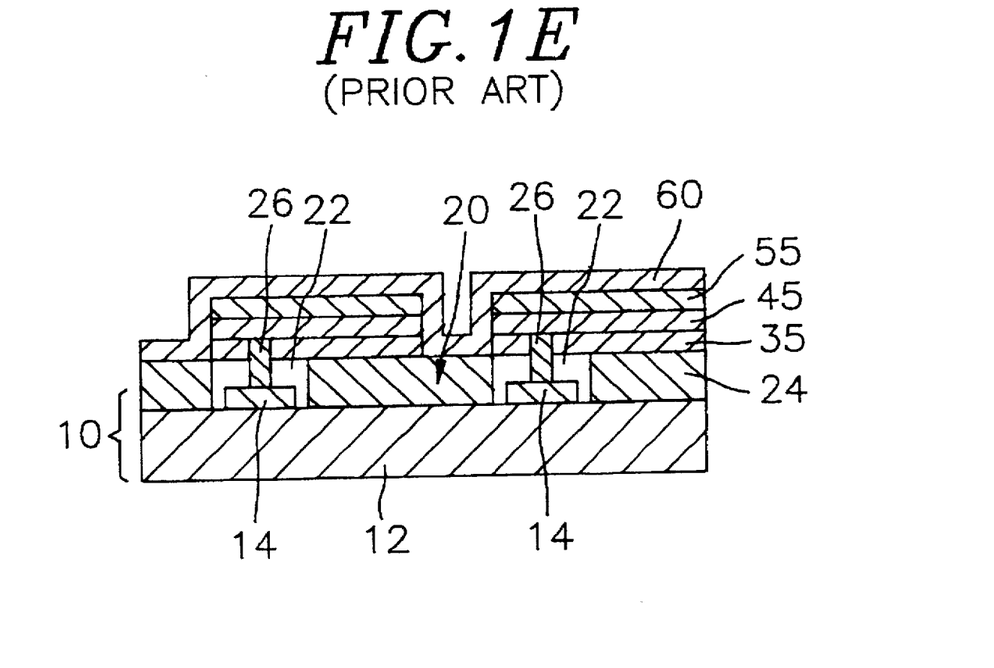
Figure 1F:
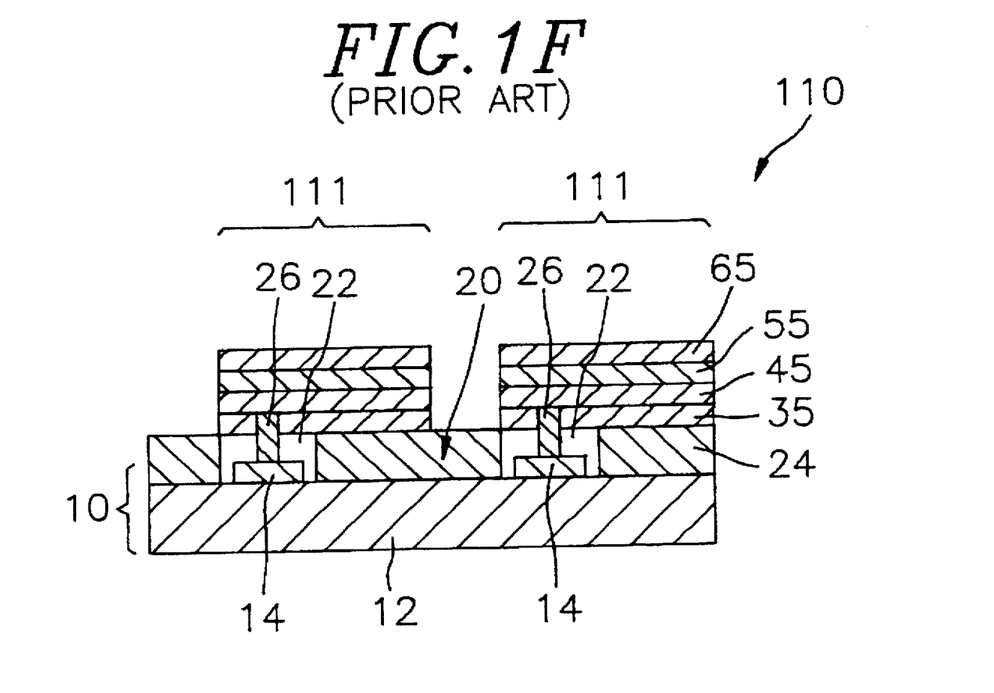

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer (not shown).

Figure 1G:
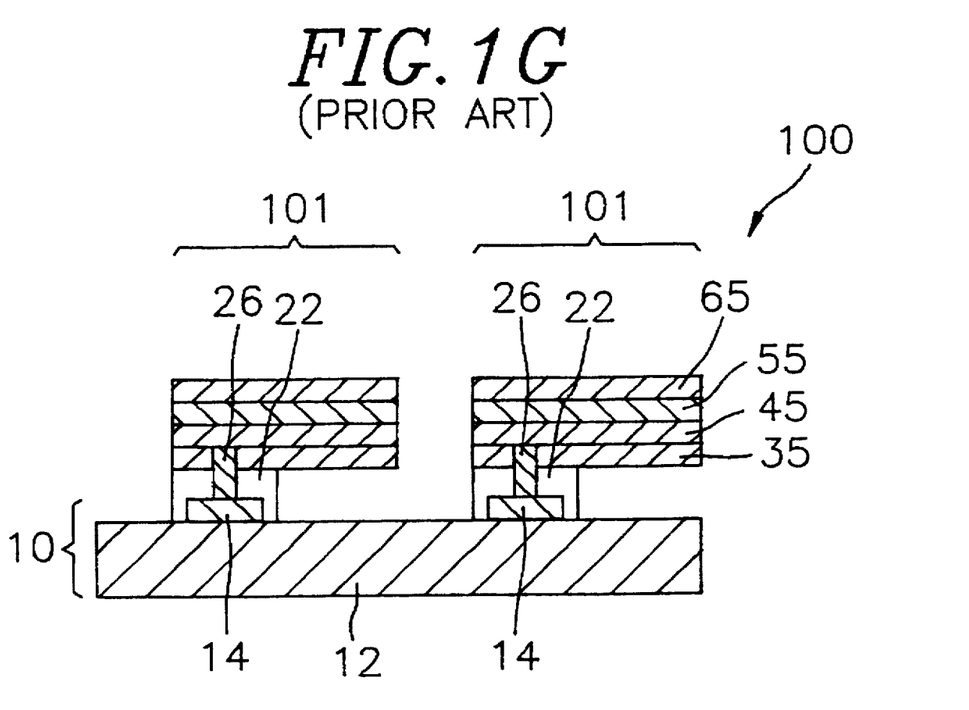

The thin film sacrificial layer 24 in the supporting layer 20 is then removed by using an wet etching method. Finally, the thin film protection layer is removed to thereby form the array 100 of M×N thin film actuated mirrors 101, as shown in FIG. 1G.

There are certain deficiencies associated with the above described method for manufacturing the array 100 of M×N thin film actuated mirrors 101. The removal of the thin film sacrificial layer 24 by using an etchant or a chemical is, generally, followed by a rinsing of the etchant or the chemical used by using a rinse, e.g., distilled water or methanol, and then by a removal of the rinse by evaporating thereof. During the removal of the rinse, however, the surface tension of the rinse may pull the elastic member 35 down toward the active matrix 10, thereby sticking the elastic member 35 to the active matrix 10, affecting the performance of the respective thin film actuated mirror 101. When enough of the thin film actuated mirrors 101 are thus affected, the overall performance of the array 100 may also degrade.

SUMMARY OF THE INVENTION

It is, therefore, a primary object of the present invention to provide a method for the manufacture of an array of M×N thin film actuated mirrors for use in an optical projection system capable of reducing the occurrence of the elastic member sticking to the active matrix during the removal of the rinse.

In accordance with one aspect of the present invention, there is provided a method for the manufacture of an array of M×N thin film actuated mirrors, wherein M and N are integers, for use in an optical projection system, the method comprising the steps of: providing an active matrix including a substrate with an array of M×N connecting terminals; depositing a thin film sacrificial layer on top of the active matrix; creating an array of M×N empty cavities on the thin film sacrificial layer, each of the empty cavities encompassing one of the connecting terminals; forming an array of M×N actuating structures on top of the thin film sacrificial layer including the empty cavities, each of the actuating structures including a first thin film electrode, a thin film electrodisplacive member, a second thin film electrode, an elastic member and a conduit; forming a thin film protection layer completely covering each of the actuating structures; removing the thin film sacrificial layer by using an etchant; rinsing away the etchant by using a rinse which is hydrophilic and volatile; removing the rinse by using a spin drying method followed by a heat treatment; and removing the thin film protection layer, thereby forming the array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

There are provided in FIGS. 2A to 2F schematic cross sectional views setting forth a method for the manufacture of an array 300 of M×N thin film actuated mirrors 301, wherein M and N are integers, for use in an optical projection system, in accordance with the present invention. It should be noted that like parts appearing in FIGS. 2A to 2F are represented by like reference numerals.

Figure 2A:
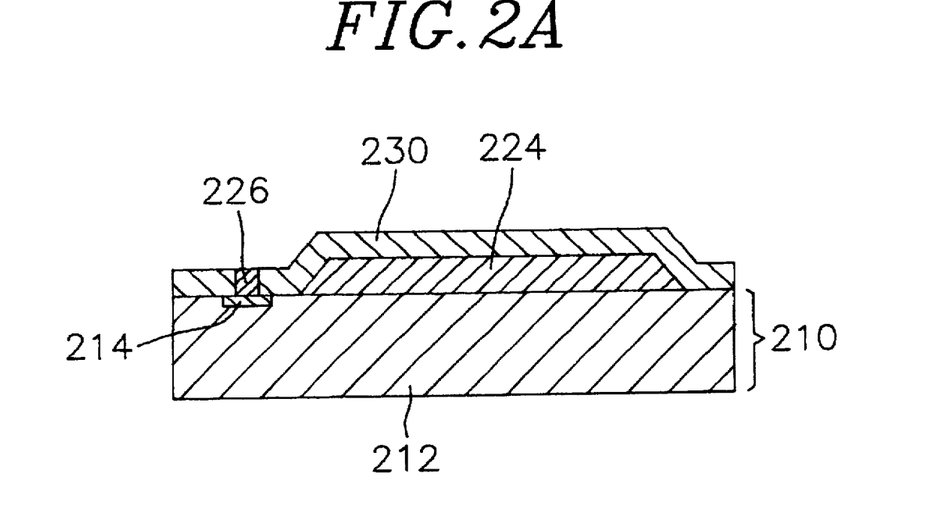
FIGS. 2A, 2B, 2C, 2D, 2E and 2F are schematic cross sectional views setting forth a method for the manufacture of an array of M×N thin film actuated mirrors in accordance with the present invention.

The process for the manufacture of the array 300 begins with the preparation of an active matrix 210 including a substrate 212 with an array of M×N connecting terminals 214 and an array of M×N transistors (not shown), wherein each of the connecting terminals 214 is electrically connected to a corresponding transistor in the array of transistors.

In a subsequent step, there is formed on top of the active matrix 210 a thin film sacrificial layer 224, having a thickness of 0.1–2 μm, and made of a metal, e.g., copper (Cu) or nickel (Ni), a phosphor-silicate glass (PSG) or a poly-Si. The thin film sacrificial layer 224 is formed by using a sputtering or an evaporation method if the thin film sacrificial layer 224 is made of a metal, a chemical vapor deposition (CVD) method or a spin coating method if the thin film sacrificial layer 224 is made of a PSG, or a CVD method if the thin film sacrificial layer 224 is made of a poly-Si.

Thereafter, there is formed an array of M×N empty cavities (not shown) on the thin film sacrificial layer 224 by using an etching method. Each of the empty cavities encompasses one of the connecting terminals 214.

Subsequently, an elastic layer 230, made of an insulating material, and having a thickness of 0.1–2 μm, is deposited on top of the thin film sacrificial layer 224 including the empty cavities by using a CVD method.

Thereafter, there is formed in the elastic layer 230 an array of M×N conduits 226 made of a metal. Each of the conduits 226 is formed by: first creating an array of M×N holes (not shown), each of the holes extending from top of the elastic layer 230 to top of the connecting terminal 214 by using an etching method; and filling therein with the metal by using, e.g., a lift-off method, as shown in FIG. 2A.

Figure 2B:
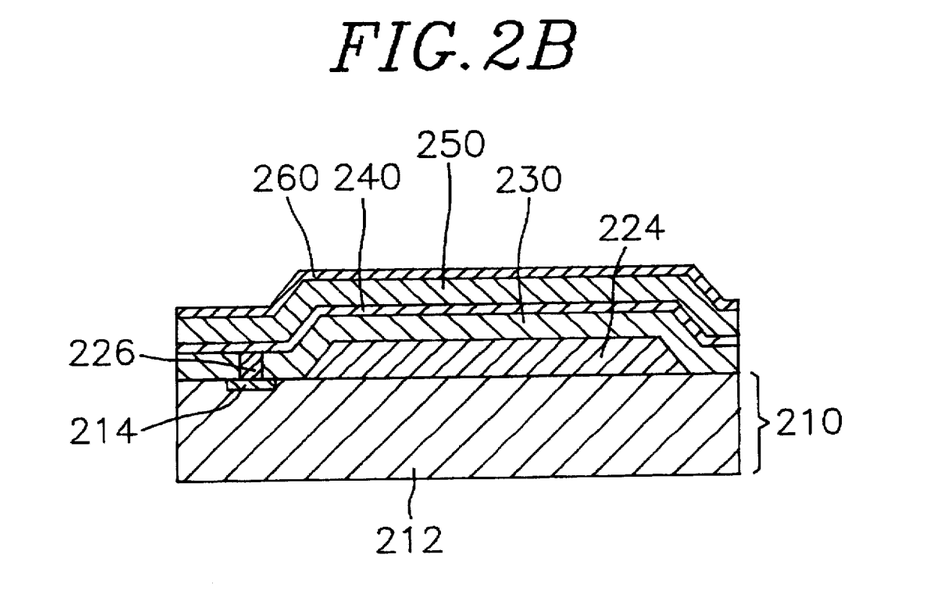

Then, a second thin film layer 240, made of an electrically conducting material, and having a thickness of 0.1–2 μm, is formed on top of the elastic layer 230 including the conduits 226 by using a sputtering or a vacuum evaporation method.

Next, a thin film electrodisplacive layer 250, made of a piezoelectric or an electrostrictive material, and having a thickness of 0.1–2 μm, is formed on top of the second thin film layer 240 by using a CVD method, an evaporation method, a Sol-Gel method or a sputtering method. The thin film electrodisplacive layer 250 is then heat treated to allow a phase transition to take place.

In an ensuing step, a first thin film layer 260, made of an electrically conducting and light reflecting material, and having a thickness of 0.1–2 μm, is formed on top of the thin film electrodisplacive layer 250 by using a sputtering or a vacuum evaporation method, as shown in FIG. 2B.

Figure 2C:
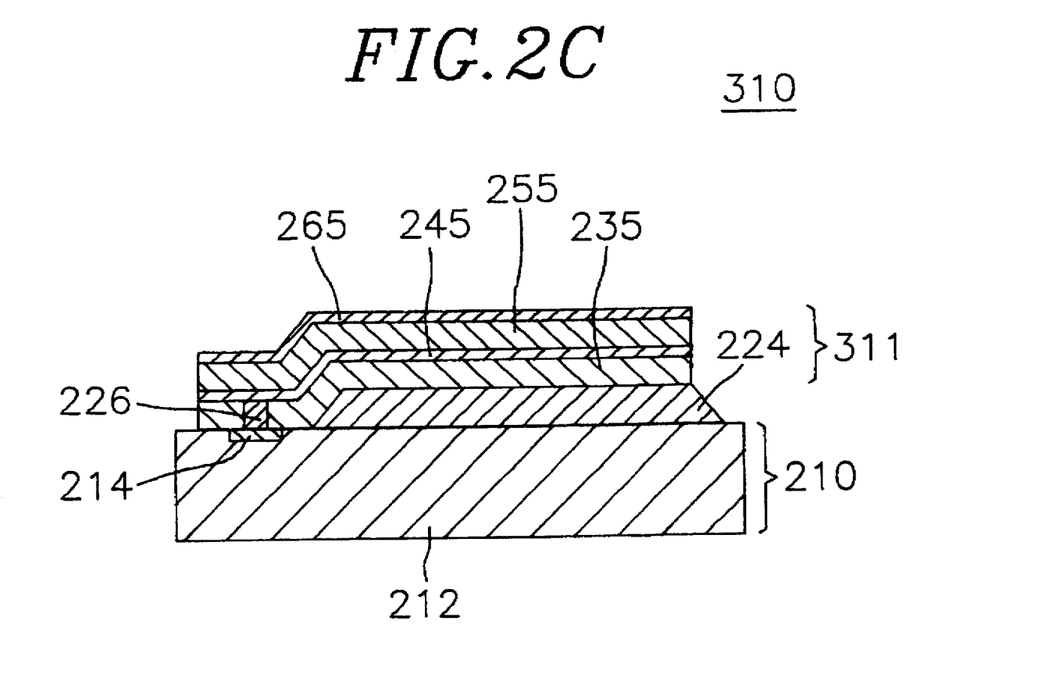

After the above step, the first thin film 260, the thin film electrodisplacive 250, the second thin film 240 and the elastic layers 230 are, respectively, patterned, until the thin film sacrificial layer 224 is exposed, by using a photolithography or a laser trimming method, thereby forming an array 310 of M×N actuating structures 311, each of the actuating structures 311 including a first thin film electrode 265, a thin film electrodisplacive member 255, a second thin film electrode 245, an elastic member 235 and the conduit 226, as shown in FIG. 2C. The second thin film electrode 245 is electrically connected to the connecting terminal 214 through the conduit 226, thereby functioning as a signal electrode in each of the actuating structures 311. The first thin film electrode 265 functions as a mirror as well as a common bias electrode in each of the actuating structures 311.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 2D:
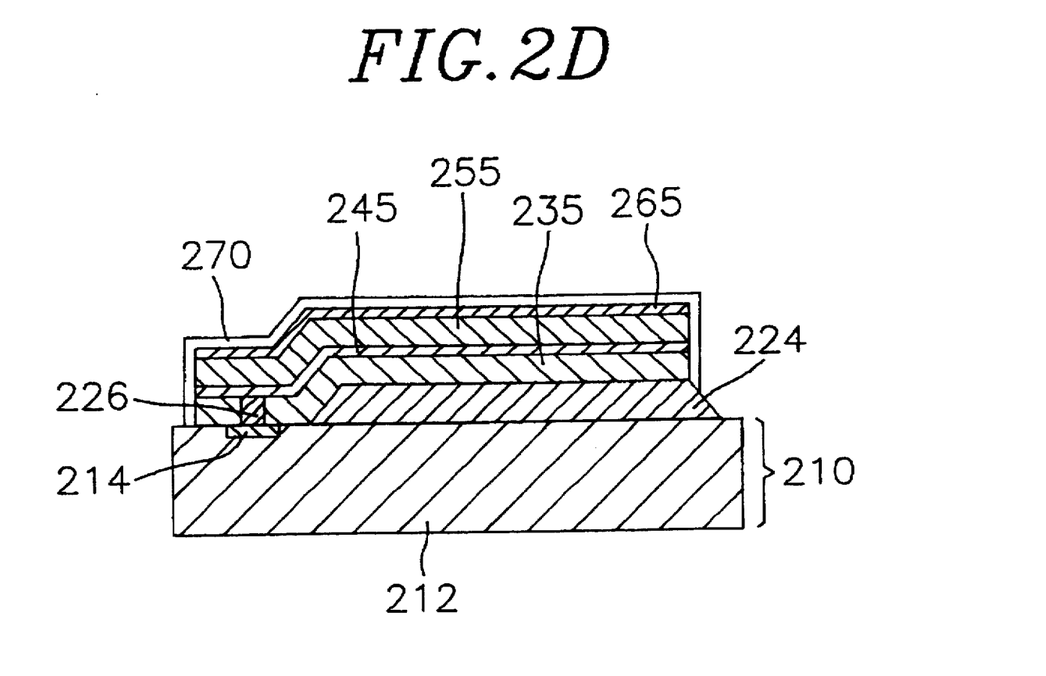

The preceeding step is then followed by completely covering each of the actuating structures 311 with a thin film protection layer 270, as shown in FIG. 2D.

Figure 2E:
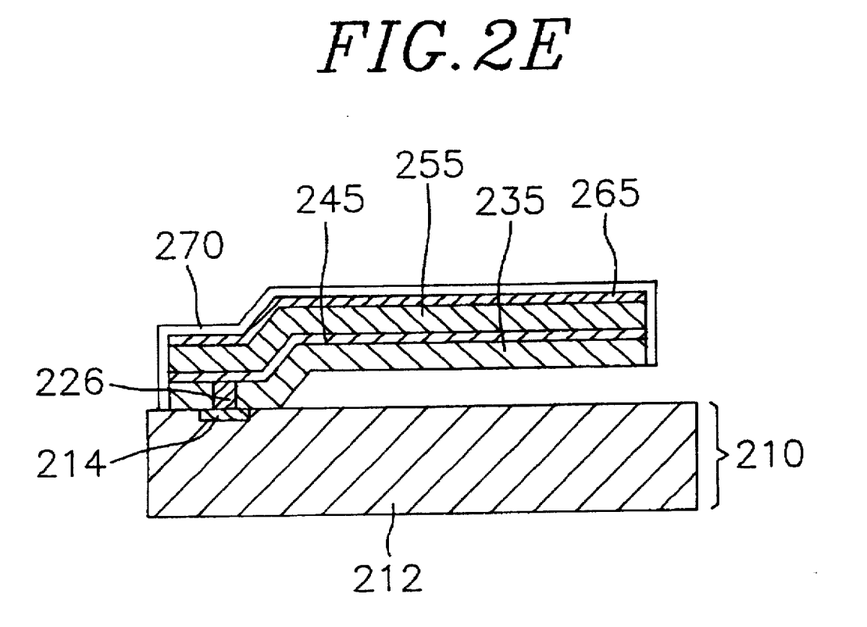

The thin film sacrificial layer 224 is then removed by using a first etchant, e.g., hydrogen fluoride (HF).

The first etchant used in the removal of the thin film sacrificial layer 224 is rinsed away by using a first rinse which is hydrophilic and volatile, e.g., iso-prophyle alcohol (IPA). Distilled water can be also used as the first rinse. The first rinse is then removed by using a spin drying method followed by a heat treatment at a temperature ranging from 60° to 200° C.

Thereafter, remnants of the thin film sacrificial layer 224 still remaining after the removal of the thin film sacrificial layer 224 are removed by using a second etchant, e.g., hydrogen fluoride (HF), as shown in FIG. 2E.

The second etchant used in the removal of the remnants of the thin film sacrificial layer 224 is rinsed away by using a second rinse having the same properties as the first rinse. The second rinse is then removed by using the same method used in the removal of the first rinse, i.e., a spin drying method followed by a heat treatment.

Figure 2F:
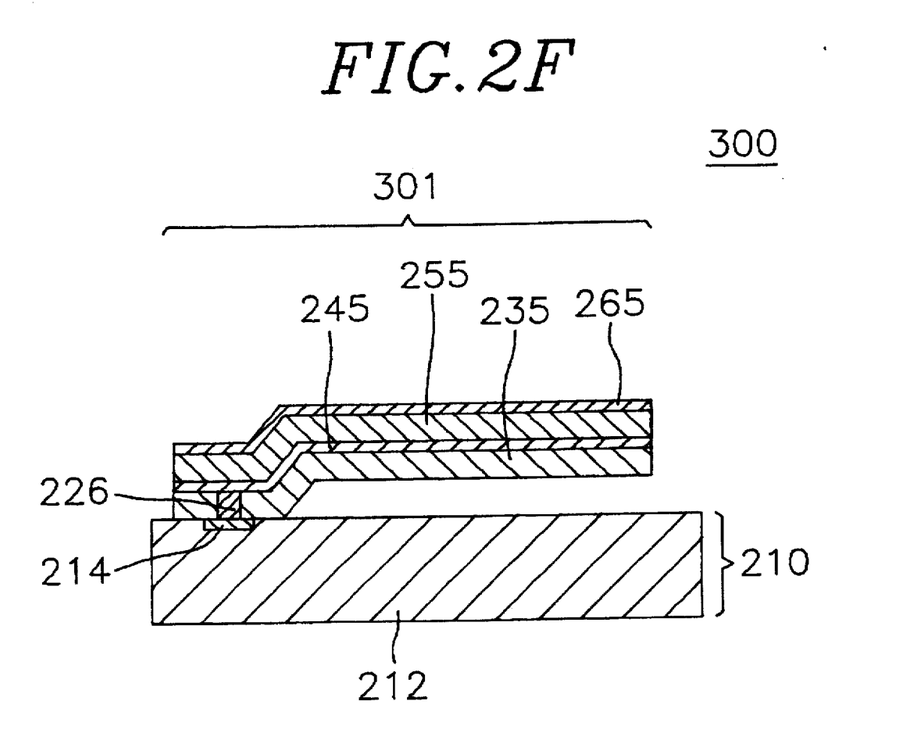

In an ensuing step, the thin film protection layer 270 is removed by using a dry etching method, e.g., a plasma etching method.

Then, remnants of the thin film protection layer 270 still remaining after the removal thereof are removed by using a third etchant, e.g., hydrogen fluoride (HF). The third etchant used in the removal of the remnants of the thin film protection layer 270 is rinsed away by using a third rinse having the same properties as the first and the second rinses. The third rinse is then removed by using the same method used in the removal of the first and the second rinses, thereby forming the array 300 of M×N thin film actuated mirrors 301, as shown in FIG. 2F.

In contrast with the method for the manufacture of the array 100 of M×N thin film actuated mirrors 101 previously disclosed, in the inventive method, since the rinses are removed by using a spin drying method followed by a heat treating method, the effect of the surface tension of the rinses can be minimized and there is less likelihood of the elastic member 235 sticking to the active matrix 210.

It should be mentioned that, even though, each of the thin film actuated mirrors 301 prepared using the inventive method has an unimorph structure, the inventive method can be equally well applied to manufacturing an array of thin film actuated mirrors, each of the thin film actuated mirrors having a bimorph structure, for the latter case just involves formation of additional electrodisplacive and electrode layers.

It should be further noted that the inventive method can be modified to allow a manufacturing an array of thin film actuated mirrors having a different geometry.

While the present invention has been described with respect to certain preferred embodiments only, other modifications and variations may be made without departing from the scope of the present invention as set forth in the following claims.

What is claimed is:

1. A method for reducing the occurrence of an elastic member in a thin film actuated mirror sticking to an active matrix including a substrate with a connecting terminal formed on top of the substrate during the manufacture thereof, wherein the thin film actuated mirror is formed by: depositing a thin film sacrificial layer on top of the active matrix; creating an empty cavity on the thin film sacrificial layer, the empty cavity encompassing the connecting terminal; forming an actuating structure on top of the thin film sacrificial layer, including a first thin film electrode, a thin film electrodisplacive member, a second thin film electrode, an elastic member and a conduit; forming a thin film protection layer completely covering the actuating structure; removing the thin film sacrificial layer by using a first etchant; and removing the thin film protection layer, the method being characterized in that:

the first etchant is removed by using a first rinse; and the first rinse is removed by using a spin drying method followed by a heat treatment.

2. The method of claim 1, wherein the first etchant used in the removal of the thin film sacrificial layer is hydrogen fluoride (HF).

3. The method of claim 1, wherein the first rinse is DI water.

4. The method of claim 1, wherein the first rinse is hydrophilic and volatile.

5. The method of claim 4, wherein the first rinse is isoprophyle alcohol (IPA).

6. The method of claim 1, wherein the heat treatment takes place at a temperature ranging from 60° to 200° C.

7. The method of claim 1, wherein the thin film protection layer is removed by using a plasma etching method.

8. The method of claim 1, after the removal of the thin film sacrificial layer, further involves the steps of:

removing remnants of the thin film sacrificial layer by using a second etchant;

rinsing away the second etchant by using a second rinse; and removing the second rinse by using a spin drying method followed by a heat treatment.

9. The method of claim 8, wherein the second etchant is hydrogen fluoride (HF).

10. The method of claim 8, wherein the second rinse is DI water.

11. The method of claim 8, wherein the second rinse is hydrophile and volatile.

12. The method of claim 11, wherein the second rinse is isoprophyle alcohol (IPA).

13. The method of claim 8, wherein the heat treatment takes place at a temperature ranging from 60° to 200° C.

14. A method for the manufacture of an array of M×N thin film actuated mirrors, wherein M and N are integers, for use in an optical projection system, the method comprising the steps of:

providing an active matrix including a substrate with an array of M×N connecting terminals;

depositing a thin film sacrificial layer on top of the active matrix;

creating an array of M×N empty cavities on the thin film sacrificial layer, each of the empty cavities encompassing one of the connecting terminals;

forming an array of M×N actuating structures on top of the thin film sacrificial layer including the empty cavities, each of the actuating structures including a first thin film electrode, a thin film electrodisplacive member, a second thin film electrode, an elastic member and a conduit;

forming a thin film protection layer completely covering each of the actuating structures;

removing the thin film sacrificial layer by using an etchant;

rinsing away the etchant by using a rinse;

removing the rinse by using a spin drying method followed by a heat treatment; and removing the thin film protection layer, thereby forming the array of M×N thin film actuated mirrors.

\* \* \* \* \*